United States Patent [19]

Engdahl

[11] 4,320,393

[45] Mar. 16, 1982

[54] PERSONAL DOSIMETER WITH REMINDER TIME

[76] Inventor: Jean Engdahl, Rue Scholl 39, 2504 Bienne, Canton of Berne, Switzerland

[21] Appl. No.: 105,192

[22] Filed: Dec. 19, 1979

[30] Foreign Application Priority Data

Jun. 7, 1978 [CH] Switzerland .................. 6204/78

[51] Int. Cl.³ .................. G08B 21/00; G01T 1/02
[52] U.S. Cl. .................. 340/600; 128/659; 250/336; 250/388; 340/309.1; 340/573
[58] Field of Search .................. 340/600, 573, 309.1, 340/527; 250/395, 336, 388, 376, 377, 378, 369; 128/659

[56] References Cited

U.S. PATENT DOCUMENTS

| | | | |
|---|---|---|---|
| 2,531,106 | 11/1950 | Brown et al. .................. | 340/600 |
| 2,802,112 | 8/1957 | Schwede .................. | 250/377 |
| 3,163,856 | 12/1964 | Kirby .................. | 340/573 |
| 3,221,166 | 11/1965 | Allenden .................. | 250/336 |
| 3,355,731 | 11/1967 | Jones, Jr. .................. | 340/309.1 |
| 3,614,442 | 10/1971 | Brodsky .................. | 250/388 |
| 3,639,844 | 2/1972 | Karklys .................. | 340/309.1 |
| 3,878,456 | 4/1975 | Erickson .................. | 250/336 |
| 3,927,375 | 12/1975 | Lande et al. .................. | 340/600 |
| 4,197,461 | 4/1980 | Umbarger et al. .................. | 340/600 |
| 4,227,086 | 10/1980 | Dreyfus et al. .................. | 250/376 |

Primary Examiner—Glen R. Swann, III
Attorney, Agent, or Firm—Silverman, Cass & Singer, Ltd.

[57] ABSTRACT

A device for individually checking exposure to radiation is sensitive to the radiation and produces an alarm (acoustic and/or optical) when a threshold radiation dose is reached. An included time-measuring device furthermore warns the user when a surveillance period has expired.

The radiation sensitive device may use an electret while the time-measuring device uses the drop in voltage of a battery occurring at the end of the discharge of the battery.

3 Claims, 4 Drawing Figures

PERSONAL DOSIMETER WITH REMINDER TIME

BACKGROUND OF THE INVENTION

This invention relates to apparatus for the individual checking of exposure to radiation, mainly X, beta and gamma rays, and also exposure to the flow of neutrons or cosmic radiation.

Exposure to certain amounts of radiation and high-energy particles is detrimental to the system on account of the destructive effect which they exert on the body cells. This true, in particular, of X, beta and gamma rays as well as, in certain cases, neutrons and cosmic rays.

As amounts of these radiations and particles cannot be directly detected by the human senses, a number of detectors have been developed in order for it to be possible to measure their intensity, to count them, or merely to confirm their presence. Among such detectors, there are Geiger counters, ionisation chambers, capacitive dosimeters, photographic films, etc.

Certain detectors measure the instantaneous value of a radiation field, for example Geiger counters and ionisation chambers, and others provide an indication as to the cumulative dose received. The latter are termed dosimeters.

The effect of radioactivity and radiation on man is cumulative, that is to say the tolerance of the body decreases as it is irradiated. If certain cells are able to regenerate, others are permanently destroyed or modified. For this reason, permitted doses do not depend merely on the intensity of radiation but also on the length of time the exposure to the radiation lasts.

Take the example of photographic film which is carried by persons who are liable to be subjected to certain types of radiation, such as the personnel in nuclear power stations. These films are periodically collected and developed and their density after development depends upon the total exposure of the user to radiation. After it has been verified that the dose received is well below what is considered to be the normal limit, the person who carried the exposed film is supplied with a new and unexposed film.

Depending upon the degree of risk involved in particular cases, the films are checked more or less frequently, the period generally varying from 24 hours to several months. This procedure, which becomes routine, is easy to put into practice within the framework of the organisation of a factory or laboratory, but it can hardly be applied to the general public.

However, the proliferation of nuclear power stations, and the reporting by the press of certain accidents during which radioactive products have escaped from controlled zones, for instance the descent of satellites carrying radioactive substances, means that many people wish to be able to check for themselves the radiation to which they may accidentally be exposed at one time or another.

As the periodic checking of all individuals can hardly be envisaged, it is desirable for everyone to be informed of the time when a period of checking is due to end, that is to say, the moment when the detector in use is due to be regenerated or changed.

SUMMARY OF THE INVENTION

The object of the present invention is to provide an apparatus for the individual checking of exposure to radiation which takes into account the length of the period of exposure and indicates when the detector is due to be regenerated or changed.

The principle of the invention consists of combining, on the one hand, an element which is sensitive to the radiation which it is desired to observe and, on the other hand, a time-measuring device which indicates to the user the end of the surveillance period.

If it is accepted, for example, that the permitted dose is 5 rems (röntegen equivalent man) the detector will be adjusted to produce an alarm if the dose of 5 rems is reached, whilst the time-measuring device will indicate after one year that the limit dose has not been exceeded, but that the sensitive element must be recharged, regenerated, measured or changed, depending upon its nature.

Other features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Figure 1:
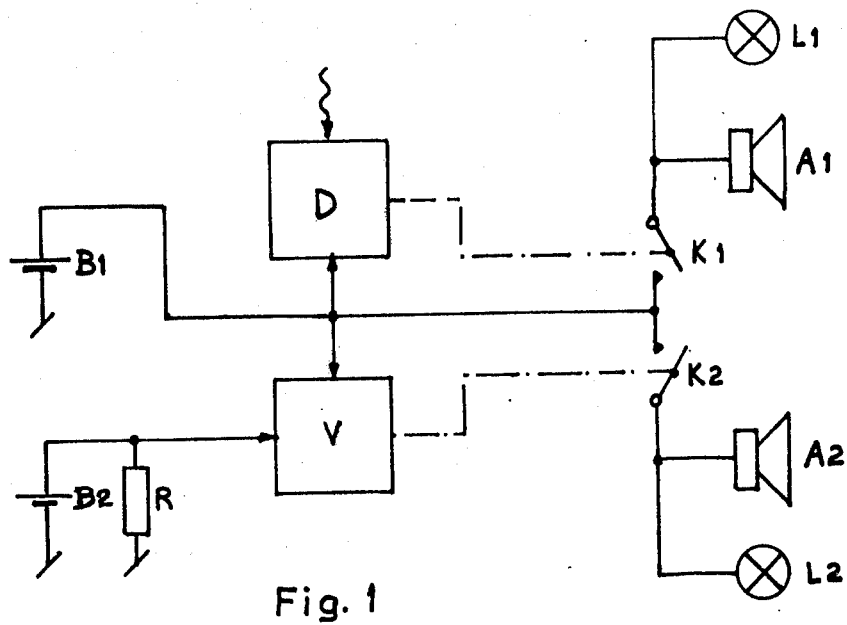
FIGS. 1 to 4 are simplified block diagrams respectively illustrating four forms of apparatus which represent illustrative embodiments of the invention.

In the apparatus of the first embodiment shown in FIG. 1, a detector D closes a contact K1 either directly or through the intermediary of an amplifier circuit and a relay, if the dose to which it is adjusted is reached. The closure of the contact K1 produces an acoustic alarm employing an electro-acoustic transducer A1, or an optical alarm employing a lamp L1, or both at the same time.

The alarm circuit and, if necessary, the detector D are supplied by a battery B1 such as to ensure a total effective life which is distinctly longer than the desired length of the period of surveillance.

A second battery B2, the capacity of which is well defined, discharges at a constant current through a load resistor R the voltage across which is monitored by a circuit V. If a battery the output voltage of which is relatively constant during the course of its life and then drops rapidly when it is exhausted is used for B2, the circuit V is operative to deliver a signal at the end of the pre-arranged surveillance period.

To this end, the circuit V operates to close a contact K2, which produces an acoustic alarm employing an electro-acoustic transducer A2, or an optical alarm employing a lamp L2, or both at the same time. These alarm signals are, however, selected in such a way that they cannot be confused with those produced as described earlier when the permitted dose of radiation is exceeded.

When the time-alarm signalling occurs, the user knows that he must have the detector element regenerated or changed. As a safety measure, not only the supply battery B2 which has reached the end of its life but also the battery B1 will be replaced at the same time.

Figure 2:
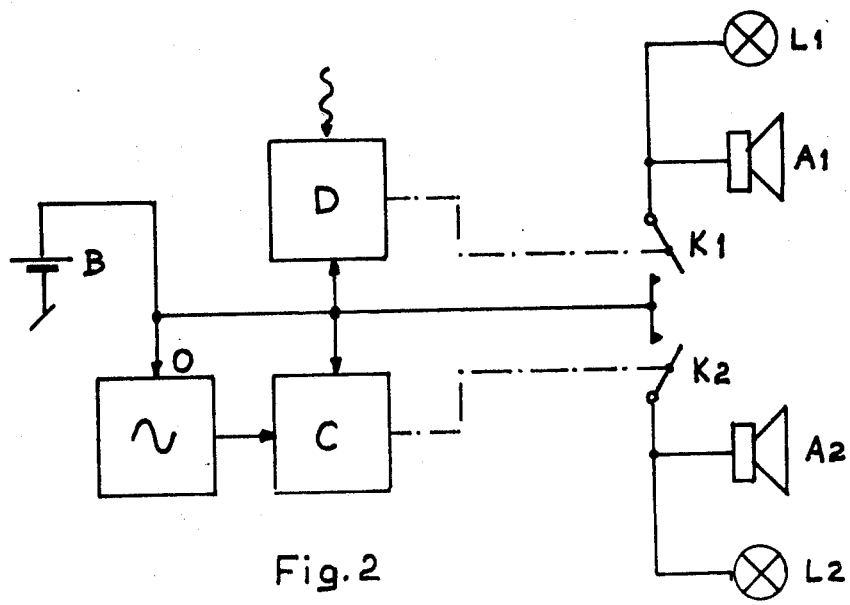

Another type of embodiment of the invention is shown in FIG. 2. In this case the time is measured by an electronic oscillator O the frequency of which is divided by a counter/divider circuit C in such a way as to actuate the contact K2 delivering the signal which indicates the end of the surveillance period after the pre-arranged length of time.

The detector D and alarm circuits indicating that the maximum permitted dose has been reached are identical in the embodiment of FIG. 2 to those of FIG. 1, but a single battery B will generally be adequate.

Figure 3:
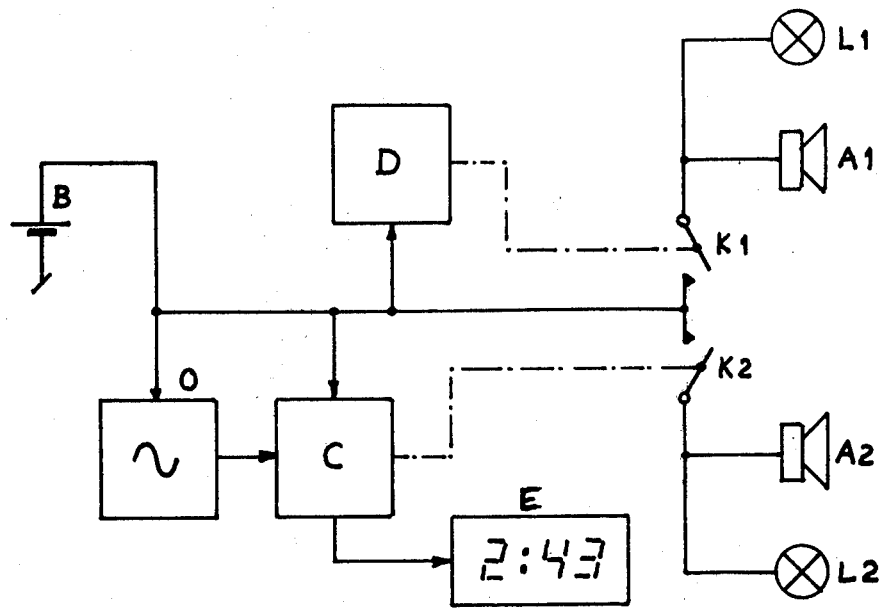

The embodiment of the invention shown in FIG. 3 is identical to the one just described, except that the presence of an oscillator and a frequency divider has been used to advantage to display the elapsed time at E. Other data connected with time may also be displayed, such as the date, day of the week, a chronographic function (stop-watch), etc., the battery B having a capacity such as to ensure independence of the system for a length of time which is greater than the specified surveillance period.

Figure 4:
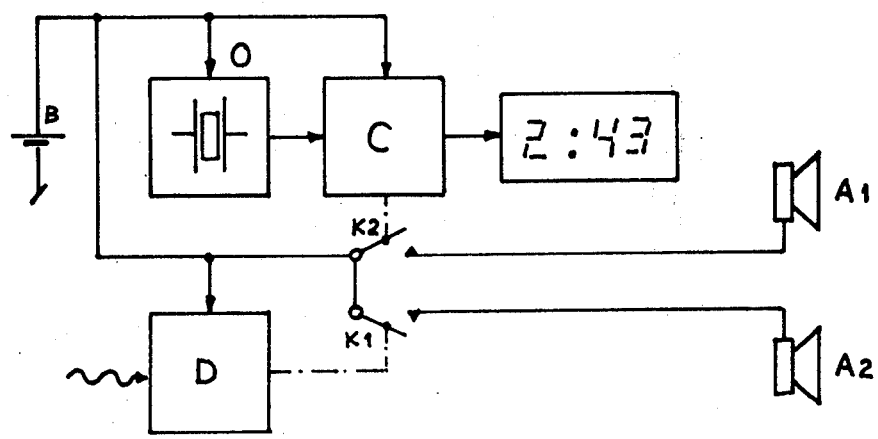

FIG. 4 illustrates an embodiment generally similar to the immediately preceding one, the difference being that its appearance is more like that of a wrist watch or a pocket watch. The various components of this apparatus will be housed in a case which is identical or similar to a watch case.

In all cases, the user of the present apparatus has at his disposal data stating that the surveillance period has expired and that he must have the detector element recharged, regenerated, measured or exchanged, depending on its type, and at the same time have the battery or batteries of the apparatus replaced.

Similarly, in all cases the detector device for measuring the radiation is of integrating type, that is to say, it accumulates the doses received from the moment it is put into service. It may be a device of the electrometer type or a system making use of the deterioration of a physical characteristic of an element which is subjected to radiation. In recent developments, electrets have been made use of in such detectors, the electric charge accumulated in the electret being progressively eliminated by irradiation.

I claim:
1. A dosimeter comprising:
    means sensitive to radiation for producing a first alarm signal when a certain radiation dose is reached or exceeded; and
    time measuring means for producing a second alarm signal when a surveillance period has expired, the second alarm signal being different from the first alarm signal and the expiration of the surveillance period being detected by a drop in voltage occurring at the end of the discharge of an energy source.
2. The dosimeter as claimed in claim 1 in which the energy source is a battery having a well defined capacity and having a relatively constant output voltage which drops rapidly when the battery is exhausted, the time-measuring means including a load resistor connected across the battery and circuit means for monitoring the drop in battery voltage across the load resistor while the battery discharges through the load resistor.
3. A dosimeter comprising:
    means sensitive to radiation for producing a first alarm signal when a certain radiation dose is reached or exceeded, said means including an electret, the electric charge accumulated in the electret being progressively eliminated by irradiation; and
    time-measuring means for producing a second alarm signal when a surveillance period has expired, the second alarm signal being different from the first alarm signal and the expiration of the surveillance period being detected by a drop in voltage occurring at the end of the discharge of an energy source.

* * * * *